United States Patent
Ismert

(10) Patent No.: US 6,241,199 B1
(45) Date of Patent: Jun. 5, 2001

(54) PROTECTIVE INSULATING SLEEVE FOR PLUMBING INSTALLATIONS

(75) Inventor: Joseph P. Ismert, Kansas City, MO (US)

(73) Assignee: Sioux Chief Manufacturing Company, Inc., Peculiar, MO (US)

( * ) Notice: Subject to any disclaimer, the term of this patent is extended or adjusted under 35 U.S.C. 154(b) by 0 days.

(21) Appl. No.: 09/260,788

(22) Filed: Mar. 2, 1999

(51) Int. Cl.$^7$ .................................................... F16L 5/00
(52) U.S. Cl. ............................ 248/56; 248/57; 248/74.1; 248/609; 248/903
(58) Field of Search ........................... 248/56, 55, 560, 248/608, 609, 903, 74.4, 73, 74.1

(56) References Cited

U.S. PATENT DOCUMENTS

| | | | |
|---|---|---|---|
| 1,721,119 | * 7/1929 | Houghton | 248/56 |
| 1,835,155 | * 12/1931 | Harbert | 248/56 |
| 3,580,988 | * 5/1971 | Oriowski | 174/153 |
| 3,684,220 | * 8/1972 | Logsdon | 248/56 |
| 3,979,093 | 9/1976 | Madden | 248/56 |
| 4,192,477 | 3/1980 | Decky et al. | 248/56 |
| 4,930,733 | 6/1990 | Logsdon | 248/56 |
| 5,108,060 | 4/1992 | Beele | 248/56 |
| 5,360,188 | 11/1994 | Condon | 248/56 |
| 5,383,688 | 1/1995 | Berry | 285/49 |
| 5,406,032 | * 4/1995 | Clayton et al. | 174/151 |
| 5,421,541 | 6/1995 | Condon | 248/56 |
| 5,488,198 | 1/1996 | Kramer | 174/48 |
| 5,537,714 | 7/1996 | Lynch et al. | 16/2 |
| 5,595,453 | 1/1997 | Nattel et al. | 403/252 |

FOREIGN PATENT DOCUMENTS

| | | | |
|---|---|---|---|
| 1202607 | * 4/1986 | (CA) | 248/74.4 |
| 254049 | * 4/1948 | (FR) | 248/56 |

OTHER PUBLICATIONS

Sioux Chief Manufacturing Company, Inc. sales Catalog #898, pp. 4,. 10 and 19, exact publication date unknown, but at least one year prior to the filing of the present application.

* cited by examiner

Primary Examiner—Leslie A. Braun
Assistant Examiner—Walter Landry
(74) Attorney, Agent, or Firm—Shughart Thomson & Kilroy P.C.

(57) ABSTRACT

A protective insulating sleeve is a two part construction with a pair of mating semi-cylindrical halves. Each semi-cylindrical half includes a semi-cylindrical metal sleeve surrounded by a semi-cylindrical plastic sleeve. The semi-cylindrical plastic sleeve has a groove formed in one exposed surface thereof and extending lengthwise along it. The semi-cylindrical metal sleeve extends outward past the semi-cylindrical plastic sleeve to form a tongue which mates with the groove in the other mating semi-cylindrical half such that the mated halves can be inserted into a bore in a stud or joist to receive a pipe or conduit extending through that stud or joist. Cushioning ribs are provided to dampen noise emanating from the pipe or conduit. The interlocked protective insulating sleeve thus serves the plural function of supporting and insulating the pipe or conduit and surrounding it with the metal sleeve to protect it from penetration by nails, screws or other fasteners driven into the stud or joist. The two part construction allows the protective insulating sleeve to be installed in a stud or joist before or after the pipe or conduit has been installed.

18 Claims, 1 Drawing Sheet

PROTECTIVE INSULATING SLEEVE FOR PLUMBING INSTALLATIONS

FIELD OF THE INVENTION

The present invention relates to a protective insulating sleeve for pipes and conduits which are routed through wall studs and construction joists, and, more particularly, to such an insulating sleeve which is formed by two separate, semi-circular pieces which interlock to extend through and encompass a transverse through bore in the stud or joist to surround and protect a pipe or conduit extending there through.

BACKGROUND OF THE INVENTION

During construction, both new and renovation, it is common for plumbing supply pipes, electrical conduits, etc. to be run through wall studs and floor and ceiling joists. Typically, the stud or joist has a bore drilled or punched through it and the pipe or conduit is routed through the bore. This routing of plumbing pipes and electrical conduits is typically done in the "rough-in" construction phases prior to installation of wall board and other interior finish materials. Problems often occur during later construction phases, or even after construction since, as nails and other fasteners are driven into the studs and joists, they often are inadvertently driven into, or immediately adjacent to, the pipe or conduit. This can cause plumbing leaks and electrical shorts, which, if the fastener is just rubbing against the pipe or conduit, may not show up for years afterward as the floors or walls shift or settle slightly.

It is required, in most building codes, to provide a sacrificial surface between the pipe or conduit and building or bracketing members which sacrificial surface both supports and (a) prevents abrasion to the pipe or conduit, during construction or when in use, due to expansion and contraction of the pipe or conduit relative to the building or bracketing member; (b) dampens noise transmission emitting from the pipe or conduit during use, due to expansion and contraction or to running water; and/or (c) prevents corrosion or electrolysis when the installation involves certain metal pipe or conduit and dissimilar, metal building or bracketing members.

In order to prevent the penetration problems, a variety of pipe and conduit protectors have been devised, which are often called "stud guards", "stud shoes", or "nail plates". Simpler protectors can consist of fairly large, relatively thick gauge steel plates which are nailed onto the outside of the stud or joist in a position level to the bore. Use of these plates can be fairly expensive, as often both sides of a member must be protected, requiring additional tools, labor and fasteners.

Separate, molded plastic insulator/supporters have been devised to provide solutions to the problems of abrasion, noise transmission and corrosion. At least one product combining penetration protection with abrasion/corrosion resistance and noise dampening has been devised and is found in U.S. Pat. No. 3,979,093 to Madden, which is directed to a pipe mounting system for studs or joists in which a notch is made in a stud or joist edge, the pipe is installed in the notch and a split plastic sleeve surrounds the pipe within the notch. A plate is then nailed over the notch to reinforce the stud or joist.

Many plastic, split-cylinder insulator/supporters have also been devised. U.S. Pat. No. 4,192,477 to Decky et al. is directed to a split ring stud connector or insulator for locating a pipe in an aperture in a metal stud wall. The ring has a pipe securing opening which is positioned off-center of the ring such that the ring can be successively turned to change the location of the off-center opening in order to align it with the pipe position. U.S. Pat. No. 4,930,733 to Logsdon is directed to a pipe holder or insulator for installation in a bore in a stud or joist. The insulator/supporter has a split sleeve with outwardly protruding vanes for engaging the bore sidewalls and with inwardly protruding cushioning fins for engaging the pipe. U.S. Pat. No. 5,360,188 to Condon is directed to a frustoconically shaped threaded insulator clamp which is tapered inward from outer to inner end to support varying sizes of pipes in differing sized bores. U.S. Pat. No. 5,421,541 to Condon is directed to a tapered wedge for mounting a pipe in a bore drilled in a stud wall. A pair of these wedges can be placed on respective opposing sides of a pipe with each wedge being driven into the bore via an outer flange.

A common variety of guards and insulators is illustrated at page 10 of the Sioux Chief Mfg. Co. Catalog No. 898, while pages 4 and 19 of that catalog show several common molded plastic split cylinder isolator/insulator/supports available.

It is clear, then, that a need exists for a combination pipe protector and insulator/supporter to protect, insulate and support pipes or conduits which extend through bores in wood or metal studs and joists, as well as bores through other building and bracketing members. Such an insulator/protector should be capable of being installed after the pipe or conduit is in position within the building structure and should completely surround the pipe or conduit to totally protect it from inadvertent penetration by fasteners, such as screws or nails; as well as provide an inert, sacrificial surface between the pipe or conduit and the building/bracketing members; and finally such a protector/insulator should use less material and should be less labor intensive to install than the combination of conventional metal protection plates and plastic insulator/supporters.

SUMMARY OF THE INVENTION

The present invention is directed to a protective insulating sleeve for plumbing installations within wall studs or joists. The insulating sleeve is of a two part construction with a pair of mating semi-cylindrical halves. Each semi-cylindrical half includes a semi-cylindrical metal sleeve surrounded by a semi-cylindrical plastic sleeve. A plurality of linear fins and/or semi-circular wings are spaced along and extend outward from the semi-cylindrical plastic sleeve. A hard plastic semi-circular end plate is attached to and extends outward from the end of the semi-cylindrical plastic sleeve and the semi-cylindrical plastic sleeve has a groove formed in one exposed surface thereof and extending lengthwise along it. The semi-cylindrical metal sleeve extends outward past the semi-cylindrical plastic sleeve to form a tongue which mates with the groove in the other mating semi-cylindrical half. A plurality of cushioning ribs can be attached to and extend lengthwise along an inside surface of the semi-cylindrical metal sleeve to cushion a pipe or conduit positioned therein.

The inventive protective insulating sleeve is used to protect pipes or conduits extending through a bore drilled or punched transversely through a wall stud or joist. The bore is drilled or punched oversized in comparison to the pipe or conduit so as to accommodate the fins and/or wings extending outward from the insulating sleeve mating halves. The protective insulating sleeve can be installed prior to running the plumbing pipe or conduit, or after the installation thereof. The identical mating halves are placed around the pipe and interlocked by inserting the metal sleeve tongue of each half into the receiving groove molded into the semi-cylindrical plastic sleeve of the mating half. The interlocked insulating sleeve is then pushed into the oversized bore in the stud or joist, thus serving the dual function of insulating/supporting the pipe or conduit and protecting it from penetration by nails, screws or other fasteners driven into the stud or joist.

OBJECTS AND ADVANTAGES OF THE INVENTION

The principal objects of the present invention include: providing a protective insulating sleeve which is designed to protect, support and insulate pipes or conduits extending through a wall stud or joist; providing such a combination protective insulating/supporting sleeve which can be installed prior to, or after installation of the pipe or conduit in the stud or joist; providing such a combination protective insulating/supporting sleeve which comprises two identical mating halves which quickly and easily interlock via a tongue and groove fitting without additional tools; providing such a combination protective insulating/supporting sleeve which fits within an oversized through bore within a stud or joist and which completely surrounds a pipe or conduit to protect, support and insulate the pipe or conduit; providing such a protective insulating sleeve in which a plurality of fins and/or wings are positioned along the outside length of the sleeve to frictionally retain the sleeve within the building member, as well as space the pipe or conduit from the sides of the through bore; providing such a protective insulating sleeve which includes an end plate which has a greater diameter than the wings, and which abuts the stud or joist outer surface immediately surrounding the through bore after the sleeve is inserted into the through bore; providing such a protective insulating sleeve which totally surrounds a pipe or conduit with metal to throughly protect it from penetration by fasteners driven into the stud or joist while using as little as half the sheet metal required by existing systems, which provide only partial protection anyway; providing such a protective insulating sleeve which can either be secured in position within the stud or joist by fasteners driven through the end plate, or can be allowed to freely rest within the stud or joist such that it would rotate when hit by a fastener being driven into the stud or joist; providing such a protective insulating sleeve which includes a cushioned interior to dampen noise transmission emitting from the pipe or conduit; and providing such a protective insulating sleeve which is economical and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
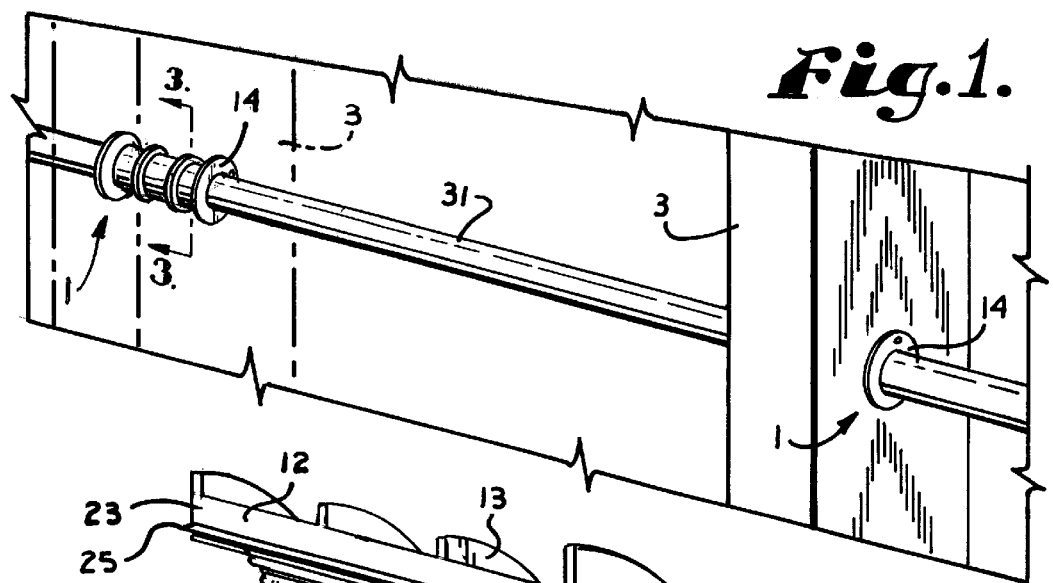
FIG. 1 is a perspective view of a pair of protective insulating sleeves in accordance with the present invention, shown installed within respective through bores extending transversely through a pair of studs and surrounding a plumbing supply pipe installed through the through bores, and with one of the studs shown in phantom lines for illustrative purposes.
Figure 2:
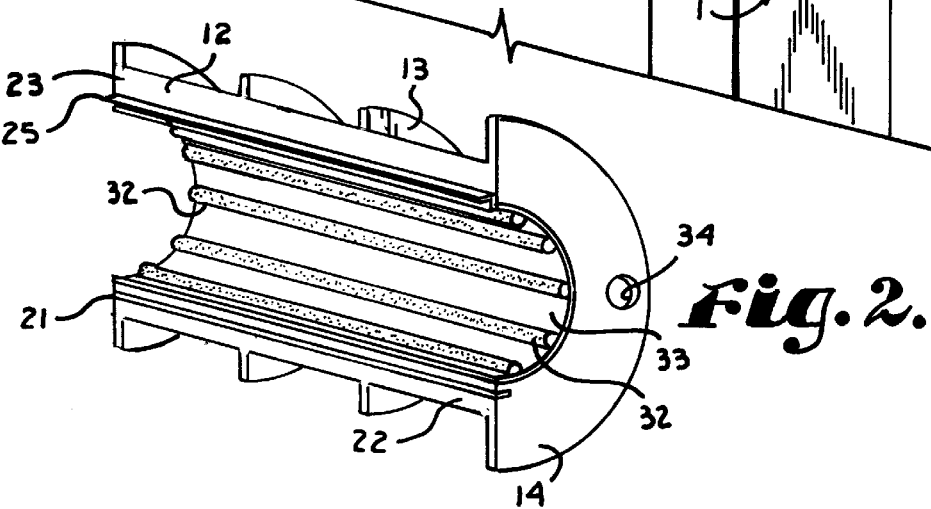
FIG. 2 is a perspective view of one of a pair of mating halves of the protective insulating sleeve of FIG. 1.
Figure 3:
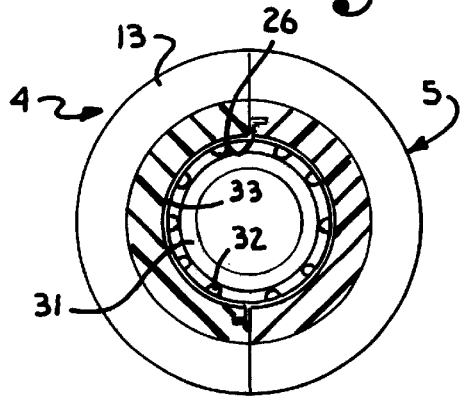
FIG. 3 is a cross sectional view of the protective insulating sleeve surrounding a plumbing supply pipe, taken along line 3—3 of FIG. 1, and illustrating the mating halves interlocked with a tongue and groove fitting.
Figure 4:
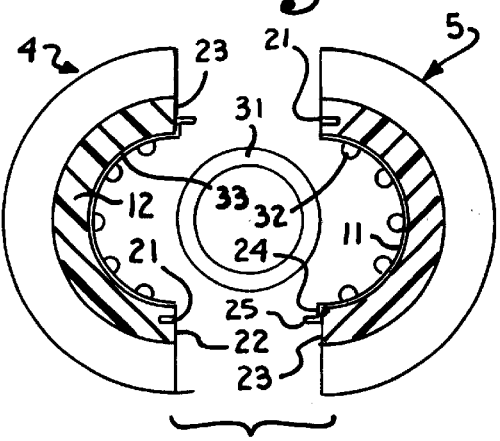
FIG. 4 is an exploded, cross-sectional view of the protective insulating sleeve, taken along the same line as in FIG. 3, but with the mating halves separated.

Referring to FIGS. 1–4, an inventive protective insulating sleeve is illustrated and generally indicated at 1. The protective insulating sleeves 1 are shown in FIG. 1 as being installed within respective transverse through bores 2 in a pair of wall studs 3. Each of the protective insulating sleeves 1 includes a pair of mating semi-cylindrical halves 4 and 5, which are identical. Each of the semi-cylindrical halves 4 and 5 includes a semi-cylindrical metal sleeve 11 surrounded by a semi-cylindrical plastic sleeve 12. A plurality of semi-circular wings 13 are spaced along and extend outward from the semi-cylindrical plastic sleeve 12. The wings 13 serve to center the protective insulating sleeve 1 within the oversized through bore 2. A hard plastic semi-circular outer end plate 14 is attached to and extends outward from the end of the semi-cylindrical plastic sleeve 12 which, when the protective insulating sleeve 1 is installed within the stud 3, abuts the outside surface of the stud 3 surrounding the through bore 2.

Each of the semi-cylindrical plastic sleeves 12 has a groove 21 formed in one exposed surface 22 thereof and extending lengthwise along the semi-cylindrical plastic sleeve 12. The semi-cylindrical metal sleeve 11 extends outward past an opposite exposed surface 23 of the semi-cylindrical plastic sleeve 12, and is bent at an offset angle 24 to form an outwardly protruding tongue 25 at the same level as the groove 21 in the opposing, mating semi-cylindrical half. The interlocked mating halves 4 and 5 thus form a central, generally cylindrical pipe receiving opening 26 for supporting and protecting a pipe, such as the pipe 31. The mating semi-cylindrical halves 4 and 5 can thus be assembled around an existing pipe, such as the pipe 31 of FIGS. 1, 4 and 5, with the respective tongues 25 mating with the opposing grooves 21, and pushed into an existing through bore, such as the through bore 2. Alternatively, the protective insulating sleeve 1 can be installed in the through bore 2 prior to installation of the pipe 31 there through.

A plurality of cushioning ribs 32 are attached to and extend lengthwise along an inside surface 33 of the semi-cylindrical metal sleeve 11 to cushion the pipe 31 positioned therein in order to dampen noise transmission emanating from the pipe or conduit during use.

The inventive protective insulating sleeve 1 provides protection, support and insulation for the pipe 31 and acts as a barrier to prevent penetration of the pipe 31 by nails, screws or other fasteners driven into the stud 3. At the same time, the amount of steel, copper or other metal used to form the semi-cylindrical metal sleeve 11 is minimal when compared to prior art stud guards, thus making the inventive protective insulating sleeve 1 very economical. The semicircular end plates 14, when mated together, can be attached to the stud 3 via screw holes 34, or, alternatively, the assembled protective insulating sleeves 1 can be allowed to freely rest within the through bores 2, which provides an added degree of protection since nails or screws striking the protective insulating sleeve 1 at an angle would tend to spin or rotate it instead of penetrating it.

While the protective insulating sleeve 1 has been described and illustrated for use with plumbing pipes, it can be equally useful with electrical or communications cables or conduits, fiber optic bundles, wire bundles, or any other elongate structure to be routed through studs or joists, therefore, the terms "pipe" and "plumbing" are not intended to be limiting. Particular details such as the generally cylindrical shape of the sleeve 1, the number and placement of the wings 13 and the end plate 14, the particular details of the interlocking tongue 25 and groove 21, etc. are meant to be exemplary only, and can be varied considerably and still accomplish the intended results. For example, a number of separate tabs and receptacles could be spaced along the mating surfaces of the sleeve halves 4 and 5 instead of a single, elongate tongue 25 and mating groove 21. While the invention has been shown and described for use with wall studs and floor joists, it could also be used to route and protect pipes and conduit which extends through walls, floors, ceilings and bracketing members and devices other than studs and joists. It is thus to be understood that while certain forms of the present invention have been illustrated and described herein, it is not to be limited to the specific forms or arrangement of parts described and shown.

I claim:

1. A protective sleeve sized for installation in a through bore extending through a building member and adapted to support a pipe extending through the through bore in the building member and to protect the pipe from damage from nails or screws driven into the building member, said protective sleeve comprising a pair of mating halves, each mating half including:
   a. a metal sleeve half with a semi-cylindrical interior opening; and
   b. a plastic sleeve half at least partially covering said metal sleeve half such that, when said pair of mating halves are positioned in abutting relationship, the said metal sleeve halves form a generally cylindrical pipe receiving opening such that the pipe supported therein is completely surrounded by a metal sleeve; and wherein
   c. opposed edges of said metal sleeve halves extend in radially overlapping relationship substantially along the entire length of said metal sleeve halves when said protective sleeve halves are secured in abutting relationship around the pipe.

2. A protective sleeve as in claim 1, wherein a portion of each said metal sleeve half extends outward past a first edge of said respective plastic sleeve half to form a tongue extending substatially along the entire length of said first edge of said plastic sleeve half, each said plastic sleeve half including a groove formed in and extending substantially along the entire length of a second edge thereof, said groove positioned to receive said tongue of said mating half positioned in abutting relationship therewith.

3. A protective sleeve as in claim 1, wherein each said mating half further comprises at least one wing which extends outward from said plastic sleeve half.

4. A protective sleeve as in claim 1, wherein each said mating half further comprises an end plate which is positioned to abut a building member when said protective sleeve is installed in a through bore in the building member.

5. A protective sleeve as in claim 1, wherein each said mating half further comprises a plurality of cushioning ribs attached to an inside surface of the metal sleeve half.

6. A protective sleeve sized for installation in a through bore extending through a building member and adapted to support a pipe extending through the through bore in the building member and to protect the pipe from damage from nails or screws driven into the building member, said protective sleeve comprising a pair of mating halves which interlock in opposed relationship to form a generally cylindrical pipe receiving opening, each half including:
   a. a metal sleeve half; and
   b. a plastic sleeve half partially covering said metal sleeve half such that a portion of said metal sleeve half extends outward past said plastic sleeve half to form a tongue, said plastic sleeve half including a groove positioned to receive said tongue of said mating half extending in opposed relationship therewith; and wherein
   c. opposed edges of said metal sleeve halves extend in overlapping relationship when said mating halves are secured in abutting relationship around the pipe.

7. A protective sleeve as in claim 6, wherein each said mating half further comprises at least one wing which extends outward from said plastic sleeve half.

8. A protective sleeve as in claim 6, wherein each said mating half further comprises an end plate which is positioned to abut a building member when the protective sleeve is installed in the through bore in the building member.

9. A protective sleeve as in claim 6, wherein each said mating half further comprises plurality of cushioning ribs attached to an inside surface of said metal sleeve half.

10. A protective sleeve as in claim 6, wherein each said metal sleeve half and each said plastic sleeve half are both generally semi-cylindrical in shape.

11. The protective sleeves as in claim 1 wherein:
   a. said metal sleeve halves are at least approximately as long as the through bore in the building member. sleeve half are both generally semi-cylindrical in shape.

12. A protective sleeve sized for installation in a hole extending through a building member having a building member thickness and adapted to protect a pipe extending through the hole in the building member from damage from nails or screws driven into the building member, said protective sleeve comprising a pair of protective sleeve halves, wherein:
   a. each protective sleeve half includes:
      i. a semi-cylindrical metal sleeve half having a sleeve length which is approximately equal to the building member thickness;
      ii. a securement member projecting radially outward from said metal sleeve half and adapted to engage the building member adjacent the hole extending therethrough; and
   b. said protective sleeve halves are sized for securement in abutting relationship around the pipe such that the pipe extends through a cylindrical opening formed between said metal sleeve halves; and wherein
   c. opposed edges of said semi-cylindrical metal sleeve halves extend in radially overlapping relationship when said protective sleeve halves are secured in abutting relationship around the pipe.

13. The protective sleeves as in claim 6 wherein:

a. said metal sleeve halves are at least approximately as long as the through bore in the building member.

14. The protective sleeve as in claim 13 wherein each of said protective sleeve halves further includes:

a. a cushioning member projecting radially inward from said metal sleeve half and in engaging relationship with the pipe extending through said cylindrical opening.

15. The protective sleeve as in claim 13 wherein said securement member is formed from plastic.

16. A method of protecting conduits or pipes extending through a hole in a building member from damage from nails or screws driven into the building member, comprising the step of securing a pair of semi-cylindrical metal sleeve halves on opposite sides of the conduit or pipe within the hole such that said pair of semi-cylindrical metal sleeve halves extend in radially outward spaced relationship from said conduit or pipe extending therebetween to form a protective sleeve surrounding said pipe or conduit; and wherein opposed edges of said metal sleeve halves are positioned in radially overlapping relationship.

17. The method as in claim 16 further comprising positioning a cushioning member between said metal sleeve halves and the conduit or pipe.

18. The method as in claim 16 further comprising positioning at least one plastic securement member between an outer surface of each said mating metal sleeve half and an inner surface of the building member along the hole.

\* \* \* \* \*